US008935335B2

(12) United States Patent
Lemay et al.

(10) Patent No.: US 8,935,335 B2
(45) Date of Patent: Jan. 13, 2015

(54) STATIONERY FOR ELECTRONIC MESSAGING

(75) Inventors: Stephen Lemay, San Francisco, CA (US); Gregory Christie, San Jose, CA (US); Bas Ording, San Francisco, CA (US); Brendan Langoulant, San Francisco, CA (US); Scott Forstall, Mountain View, CA (US); Judy Halchin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1544 days.

(21) Appl. No.: 11/498,999

(22) Filed: Aug. 4, 2006

(65) Prior Publication Data
US 2008/0034117 A1     Feb. 7, 2008

(51) Int. Cl.
| G06F 15/16 | (2006.01) |
| H04N 1/46 | (2006.01) |
| G06F 17/24 | (2006.01) |
| G06Q 10/10 | (2012.01) |

(52) U.S. Cl.
CPC ............ *G06F 17/248* (2013.01); *G06Q 10/107* (2013.01)
USPC .......................................... 709/206; 358/540

(58) Field of Classification Search
USPC ......................................................... 709/206
See application file for complete search history.

(56) References Cited

U.S. PATENT DOCUMENTS

| 6,748,421 | B1* | 6/2004 | Ozkan et al. | 709/206 |
| 7,028,075 | B2* | 4/2006 | Morris | 709/206 |
| 2002/0048413 | A1* | 4/2002 | Kusunoki | 382/282 |
| 2005/0134939 | A1* | 6/2005 | Ikeda et al. | 358/471 |
| 2005/0273470 | A1* | 12/2005 | Heigold | 707/104.1 |
| 2006/0181736 | A1* | 8/2006 | Quek et al. | 358/1.18 |
| 2007/0226275 | A1* | 9/2007 | Ruul | 707/204 |
| 2007/0271347 | A1* | 11/2007 | Logue et al. | 709/206 |

OTHER PUBLICATIONS

IncrediMail—Email has Finally Evolved, http://www.incredimail.com/english/splash/splash.asp, downloaded on Jul. 19, 2006, 18 pages.
Apple—iLife—iWeb—Apple-designed Templates, Get a head start with templates, http://www.apple.com/ilife/iweb/features/templates.html, downloaded on Jul. 20, 2006, 2 pages.

* cited by examiner

*Primary Examiner* — Emmanuel L Moise
*Assistant Examiner* — Mahran Abu Roumi
(74) *Attorney, Agent, or Firm* — Adeli LLP

(57) ABSTRACT

Stationery templates for electronic messages are provided in an electronic messaging system. For one embodiment, a user can select from a list of categories and within each category is a set of one or more stationery templates from which a user can choose. The user may edit the stationery template. The user can also create custom stationery and share it with other users. Upon selection or creation of a stationery template, the user is presented with a formatted electronic message and can add, remove, or edit text content or replace media content. Alternatively, a stationery template can be changed or added to the electronic message after the user has begun composing and editing the text content. The content and format of the text and media components are carried over into the new template. When the message is sent, it is saved and transmitted in a format such that it can be rendered to look the same at the receiving machine.

33 Claims, 12 Drawing Sheets

STATIONERY FOR ELECTRONIC MESSAGING

FIELD OF THE INVENTION

This invention relates to electronic messaging such as email or instant messaging.

BACKGROUND

Electronic messaging is a widespread method of communication. Electronic messages can be sent and received via a computer, cellular telephone, or other data processing device that has access to a communication medium such as a network of other such devices.

A common computer network used to send and receive electronic messages is the Internet. A person who wishes to connect to the Internet may do so using a modem, e.g. telephone modem, cable modem, digital subscriber line (DSL) modem, etc., to connect to an internet service provider (ISP) such as Earthlink, Comcast, or AT&T. Alternatively, users may connect via cellular telephones, direct network connections (e.g. T-1 line), wireless local area networks, satellite, and other methods known in the art.

A user of electronic messaging can send text-based messages as well as other information and media, e.g. pictures, video, sound recordings, documents, etc., that are in an electronic format to other users that have access to electronic messaging. The format of the text, media, and other information sent within the body of an electronic message, rather than as an attachment, may be rendered differently by the system and/or program that receives the message than the format as it was composed by the sender. Often the pictures, videos, and sound recordings are transmitted as an attachment to the electronic message rather than a part of the message itself. Electronic messaging users are typically left to express themselves with text and attachments alone.

Users that are familiar with web page design language(s) have been able to overcome this disadvantage by composing small web pages and sending them as electronic messages. However, a great number of electronic message users are not familiar with web page design and, even for those users who are familiar with web page design, the act of composing a small web page is time consuming. Other users have overcome this disadvantage by utilizing programs capable of word processing, creating slide shows, web design, etc. to create interesting electronic messages. However, this method requires an additional program, knowledge of that program, cooperation between that program and the electronic messaging program, and time and labor to create such message.

Some electronic messaging programs have provided users with the options of utilizing prefabricated backgrounds that may not be edited or utilizing an image file as a custom background image. Although these options may be faster and more user friendly than the former techniques, these background images often are not rendered properly at the recipient's computer, if at all, when the recipient uses a different electronic messaging program than that of the sender. Manipulation of the image or other media files incorporated into the template is often not allowed; when it is allowed, the manipulation is difficult and requires use of additional editing software.

Accordingly, there is a need for a user-friendly method to send rich dynamic-looking electronic messages that are easily manipulated and personalized by the user and received as formatted by the user who sent the electronic message.

SUMMARY OF THE DESCRIPTION

Methods and apparatuses for providing stationery templates for electronic messages that may be edited, created, and shared by a user and transmitted in a format such that it can be rendered to look the same at the receiving machine as formatted by the user who sent the electronic message.

Embodiments of the invention may be represented as a software product stored on a machine readable medium (also referred to as a computer readable medium or processor readable medium). According to one aspect of the invention, the machine readable medium includes instructions that, when executed by a machine causes the machine to perform operations comprising receiving user input to compose an electronic message including the selection of a stationery template from a list of categories. The user may edit a stationery template or create a custom stationery template. Custom stationery can be shared with or obtained from other users and third parties.

Upon selection or creation of a stationery template, the user is presented with a formatted electronic message and can add, remove, or edit text content or replace media content. Alternatively, a stationery template can be changed or added to the electronic message after the user has begun composing and editing the text content. The content and format of the text and media components are carried over into the new template. When the message is sent, it is saved and transmitted in a format such that it can be rendered to look the same at the receiving machine. Other embodiments, including methods and apparatuses, are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
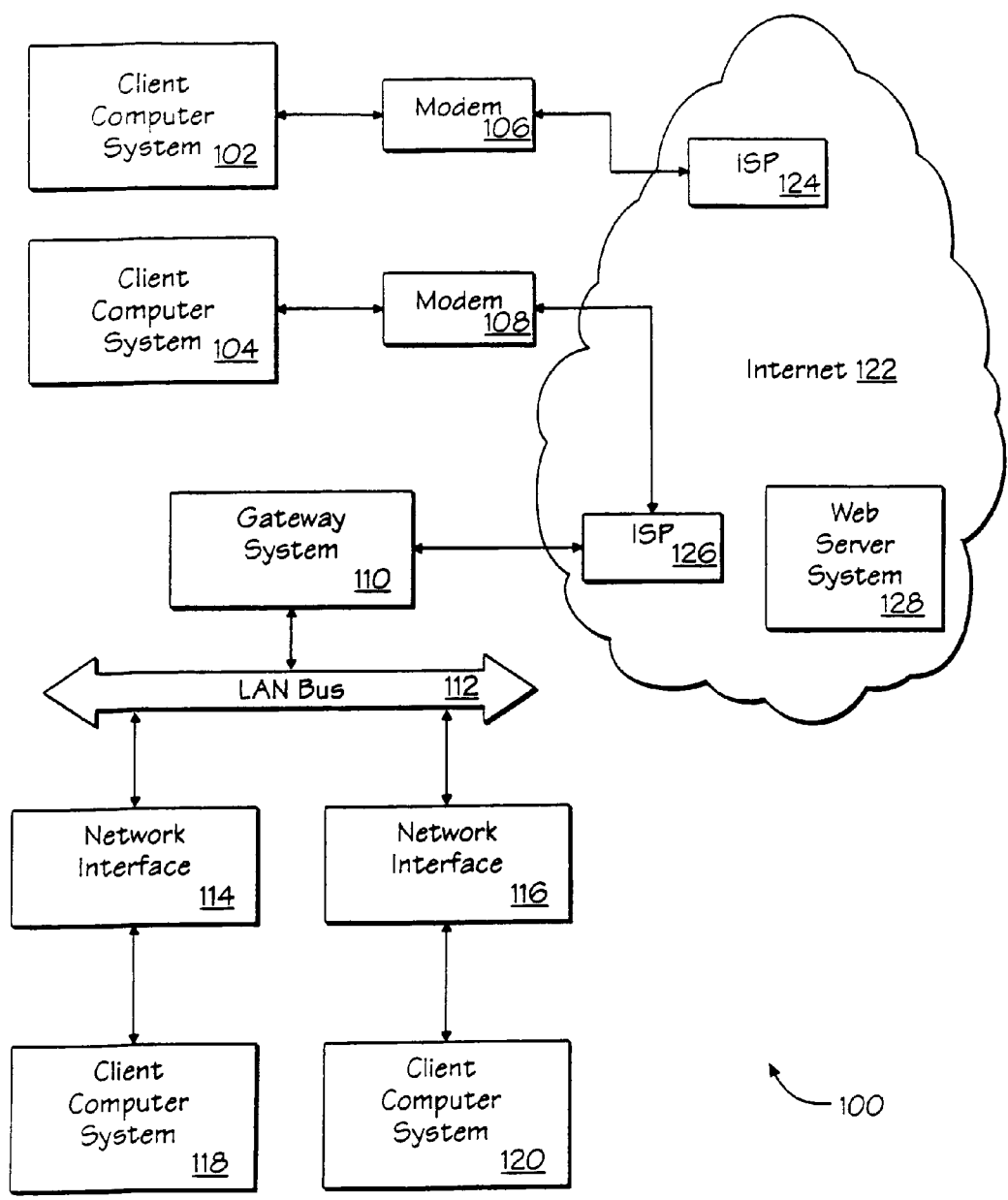
FIG. 1 shows a diagram of a network of computer systems in which an embodiment of the present invention may be used.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2006.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Embodiments of the present invention provide stationery templates for messages in an electronic messaging system. For one embodiment, a user can select one or more stationery templates from a list of categories. A user can also create custom stationery and share it with other users. For example, a user can transmit, through a network, an edited template to another user who can use this template (e.g. by instructing the receiving system to install this template).

Upon selection or creation of a stationery template, the user is presented with a formatted electronic message. The user can add, remove, or edit text or media content to the body of the message. Templates may contain designated frames for the user to drag and drop media, such as images, video, sound recordings, and other files (e.g. formats including, but not limited to JPEG, GIF, PNG, QuickTime, MPEG, AVI, Macromedia Flash, etc.).

Alternatively, a stationery template can be changed or added to the electronic message after the user has begun composing and editing the text content. The content and format of the body of the message and media content of the template will be carried over into the new template.

When the message is sent, it is saved and transmitted in a format such that it can be rendered to look the same at the receiving machine. The message may be sent in a standard mark up language such as Multipurpose Internet Mail Extensions (MIME) Multipart with a Hypertext Markup Language (HTML) part or XML part. Alternate formats may include JPEG, GIF, PNG, QuickTime, MPEG, AVI, Macromedia Flash, etc.

FIG. 1 is a diagram of a network of computer systems in which one embodiment of the present invention may be used. As shown in FIG. 1, a network 100 includes a number of client computer systems that are coupled together through an Internet 122. The term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. The system may also be implemented in an Intranet within an organization or other network known in the art.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126.

Access to the Internet may facilitate transfer of information (e.g., electronic messages, text files, media files, etc.) between two or more digital processing systems, such as the client computer systems 102, 104, 118, and 120 and/or a Web server system 128.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML documents (e.g., Web pages), which may be provided by the Web server 128. An embodiment of the current invention may enable client computer systems 102, 104, 118, and 120 to send and/or receive HTML-based electronic messages using stationery templates described in greater detail below.

The ISP 124 provides Internet connectivity to the client computer system 102 via a modem interface 106, which may be considered as part of the client computer system 102. The client computer systems 102, 104, 118, and 120 may be a conventional data processing system, such as a iMac, MacBook, Mac mini, or Power Mac computer available from Apple Computer, Inc., a "network" computer, a handheld/portable computer, a cell phone with data processing capabilities, a Web TV system, or other types of digital processing systems (e.g., a PDA) or other handheld or embedded device or consumer electronic devices.

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

Figure 2:
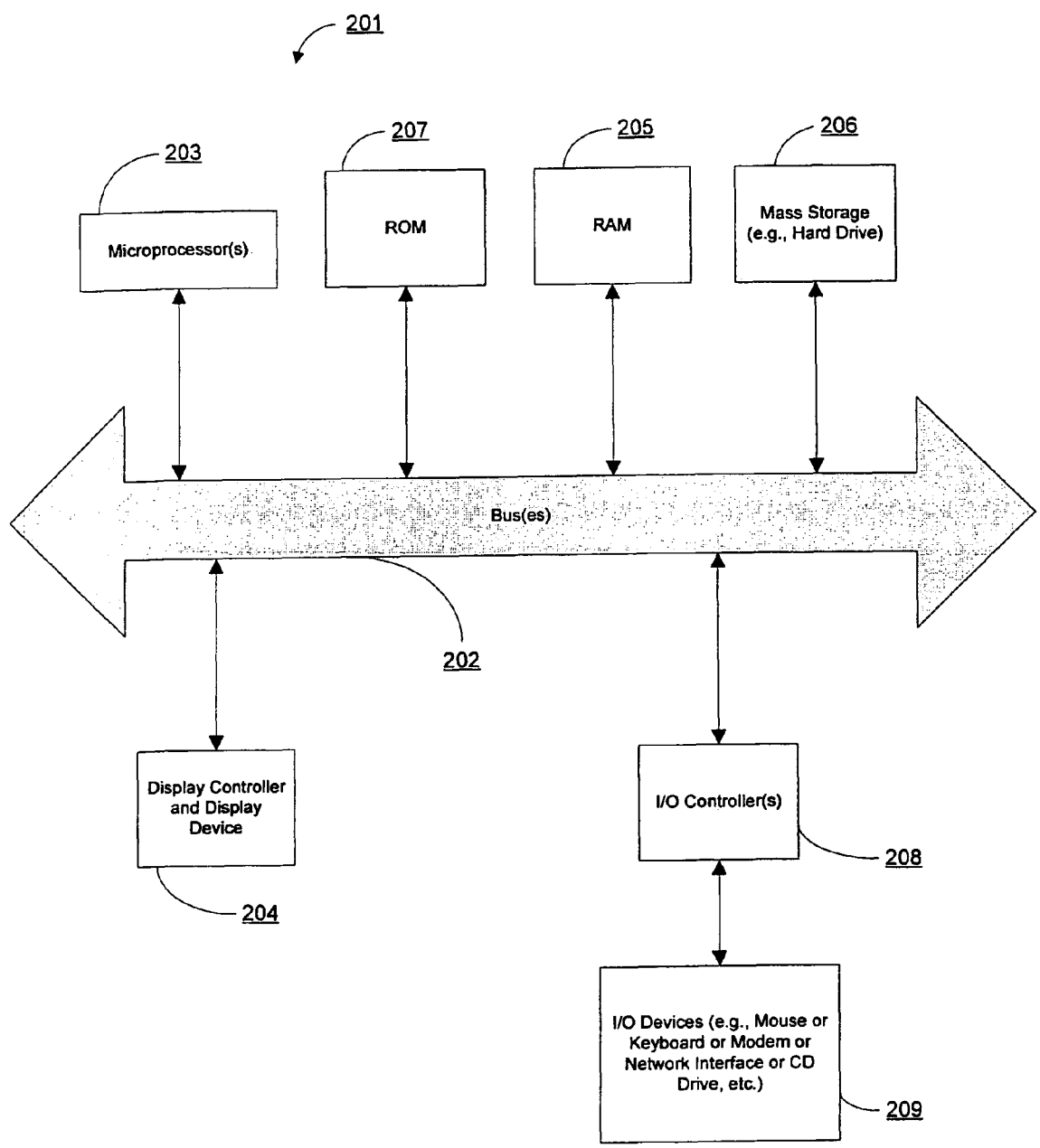
FIG. 2 shows an exemplary embodiment of a data processing system, which may be a general purpose computer system and which may operate in any of the various methods described herein.

FIG. 2 shows one example of a typical computer system which may be used with the present invention. Note that while FIG. 2 illustrates various components of a computer system, it is not intended to represent any particular architecture or manner of interconnecting the components as such details are not germane to the present invention. Network computers, handheld computers, cellular telephones, personal digital assistants (PDAs), media players (e.g. an iPod), devices which combine aspects or functions of these devices (e.g. a media player combined with a PDA and a cellular telephone in one device), an embedded processing device within another device, and other data processing systems which have fewer components or perhaps more components may also be used to implement one or more embodiments of the present invention. The computer system of FIG. 2 may, for example, be an iMac, MacBook, Mac mini, or Power Mac computer from Apple Computer, Inc.

As shown in FIG. 2, the computer system 201, which is a form of a data processing system, includes a bus 202 which is coupled to a microprocessor(s) 203 and a ROM (Read Only Memory) 207 and volatile RAM 205 and a non-volatile memory 206. The microprocessor 203 may be one or more G3 or G4 microprocessors from Motorola, Inc., one or more G5 microprocessors from IBM, or one or more Intel® Core™ Duo microprocessors from Intel Corporation. The bus 202 interconnects these various components together and also interconnects these components 203, 205, 206, and 207 to a display controller and display device 204 and to peripheral devices such as input/output (I/O) devices 209 which may be mice, keyboards, modems, network interfaces, printers and other devices which are well known in the art. Typically, the input/output devices 209 are coupled to the system through input/output controllers 208. The volatile RAM (Random Access Memory) 205 is typically implemented as dynamic RAM (DRAM) which requires power continually in order to refresh or maintain the data in the memory. The mass storage 206 is typically a magnetic hard drive or a magnetic optical drive or an optical drive or a DVD RAM or other types of memory systems which maintain data (e.g. large amounts of data) even after power is removed from the system. Typically, the mass storage 206 will also be a random access memory although this is not required.

While FIG. 2 shows that the mass storage 206 is a local device coupled directly to the rest of the components in the data processing system, the present invention may utilize a non-volatile memory which is remote from the system, such as a network storage device which is coupled to the data processing system through a network interface such as a modem or Ethernet interface. The bus 202 may include one or more buses connected to each other through various bridges, controllers and/or adapters as is well known in the art. In one embodiment the I/O controller 108 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 207, RAM 205, mass storage 206 or a remote storage device. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 203.

Figure 3:
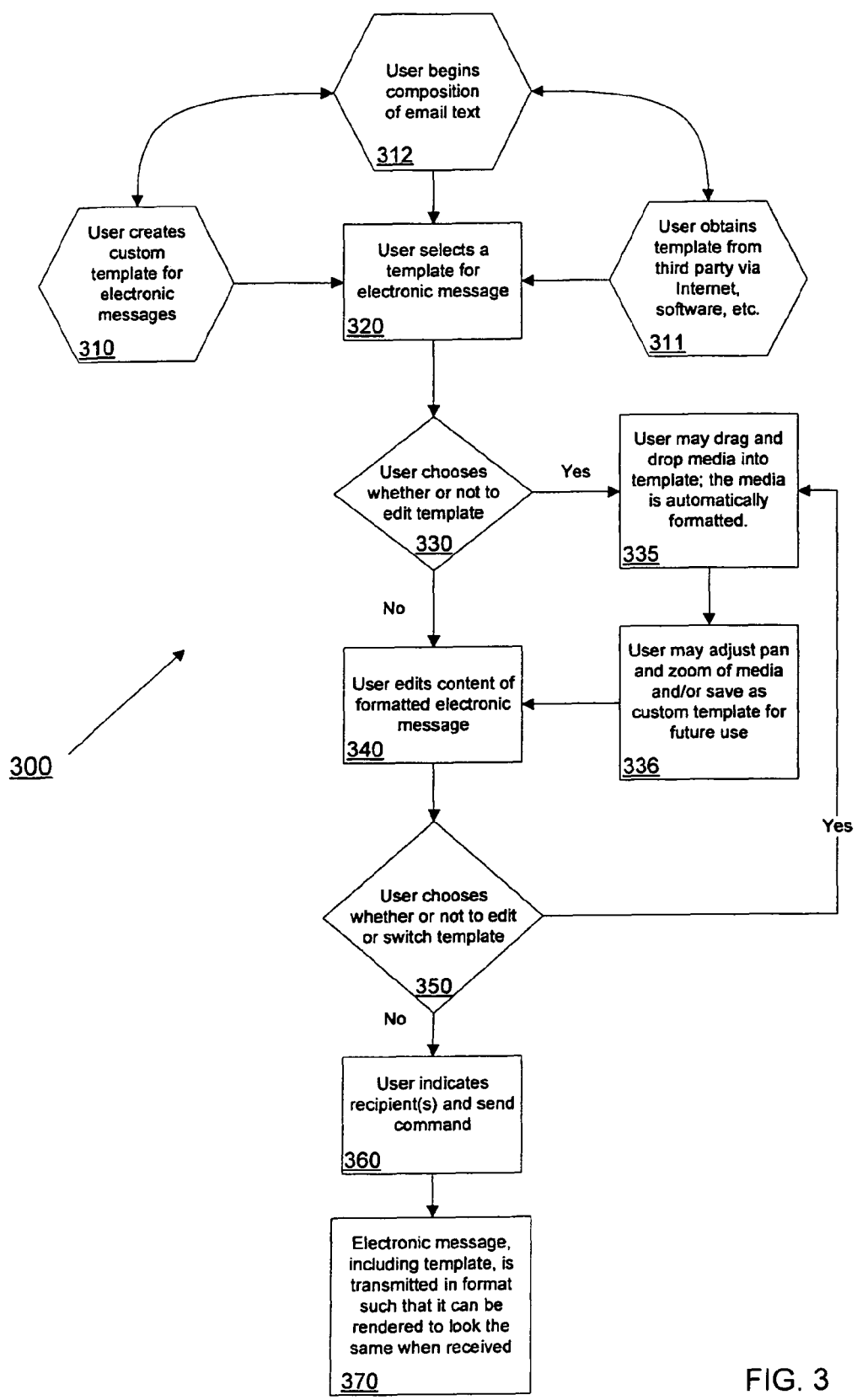
FIG. 3 is a flow chart that shows an exemplary method of the present invention.
Figure 4A:
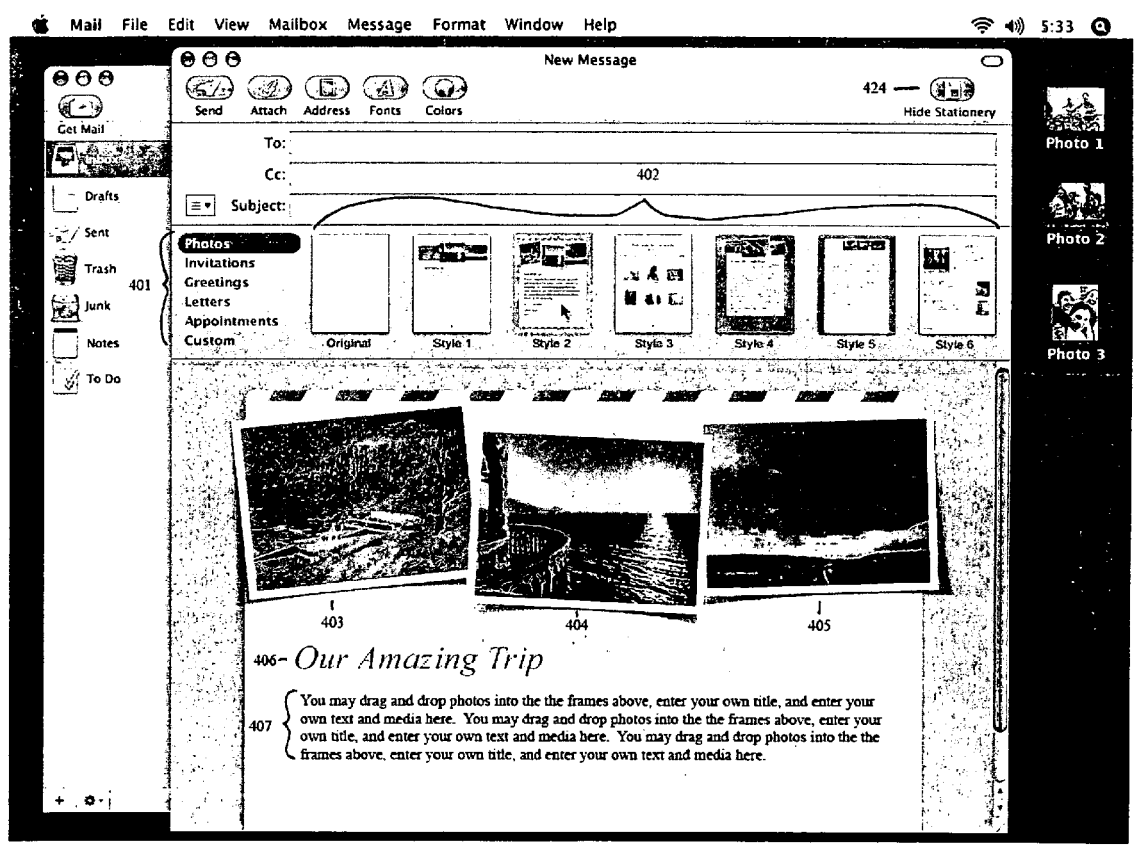
FIG. 4a shows the selection of a stationery template within an exemplary user interface for an embodiment of the present invention

FIG. 3 is a flow chart that shows an exemplary method 300 of the present invention. At block 320, a user may begin by selecting an existing stationery template. FIG. 4a shows an exemplary user interface for an embodiment of the present invention, specifically the stationery picker within an electronic messaging program. The user first selects a category of stationery templates from a list of categories 401. For an embodiment, the title Favorites may be included in the list of categories 401. The user may move her favorite stationery templates into this category for easy and quick access by a drag and drop operation or other means known in the art, e.g. using a drop-down menu, right-click operation, etc. Once a category has been chosen, the user selects a stationery template from the list of styles 402 presented with thumbnail previews. The selected style will be displayed to the user for editing and composition of the electronic message.

For an embodiment of the present invention, stationery templates are implemented as a bundle of files comprising an Extensible Markup Language (XML) file, a Hypertext Markup Language (HTML) file, and image and media files. The XML file serves as a table of contents, specifying the names and locations of the HTML file, image, and other media files.

The HTML file contains the content of the stationery template in HTML format so that the content may be rendered by the receiving machine according to the same layout as it was transmitted. The HTML file contains references to the image and media files containing the images and media incorporated into stationery template.

The image and media files comprise multiple layers within the stationery template including the background, frames, and images and media inserted into the stationery template.

Figure 4B:
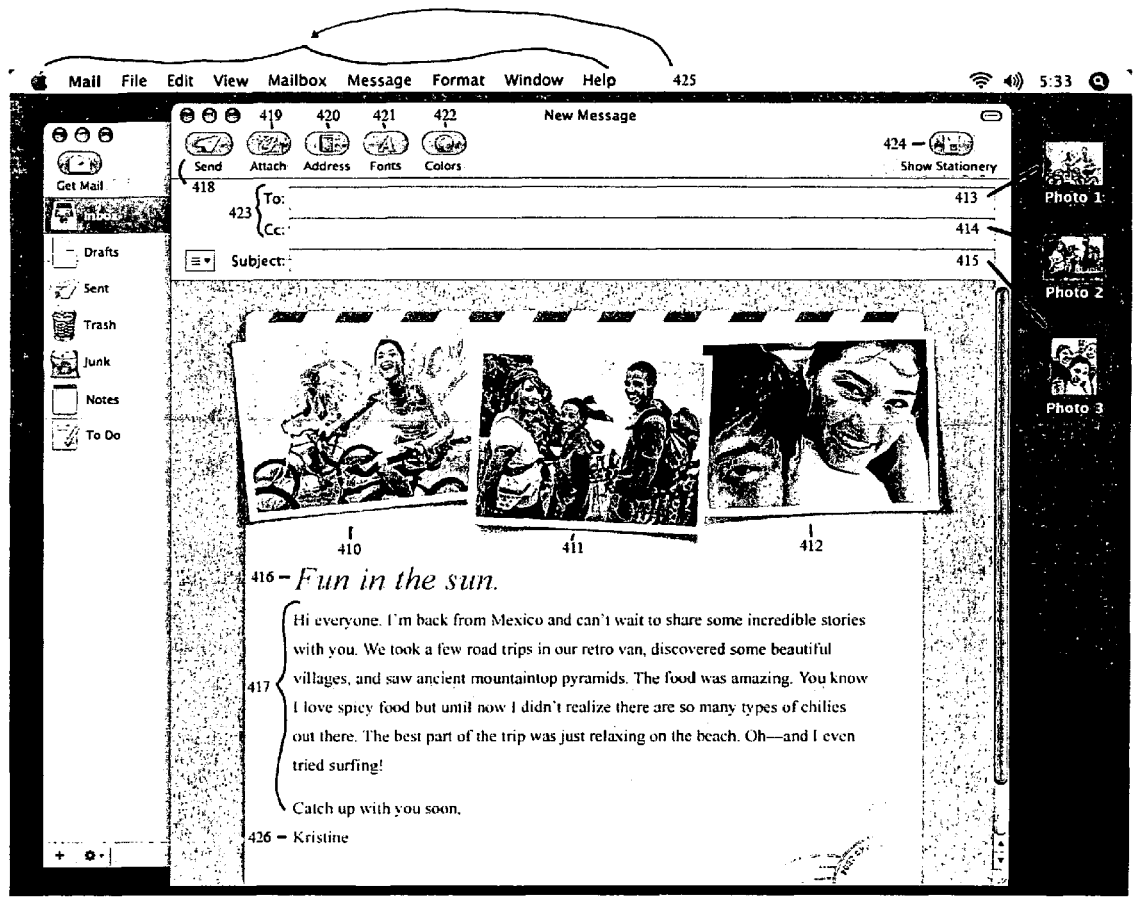
FIG. 4b shows an exemplary user interface for an embodiment of the present invention after the template media have been replaced and edited.

Referring to FIG. 3, at block 330, the user may choose to edit the stationery template. At block 335, the user can replace default media elements 403-405 with personalized media selections. For an alternate embodiment, the media frames may contain no default media elements, and the user could insert personalized media files into the empty frames. FIG. 4b shows the manipulation of media within the stationery template for an embodiment of the present invention. For one embodiment the user may drag media files 413-415 from a file within her computer system, e.g. the desktop, and drop them into frames 410-412. Alternatively the user may use another method or means known in the art to select media files for use within the stationery template, e.g. cut and paste, right-click operation, selection from a drop-down menu 425, etc. The newly selected media files 413-415 will be automatically formatted, e.g. size and rotation, within the stationery template frames 410-412 using position and rotation information contained in the XML file in the template bundle. For another embodiment, the media files may be manipulated in other ways known in the art, e.g., creating a texture map and projecting the media image onto a three dimensional surface, page roll highlight, etc.

At block 336, the user then may continue to edit the media files within frames 410-412 by adjusting the pan and zoom and save the custom template for future use. The pan and zoom may be adjusted by selecting the appropriate operation from a drop-down menu 425, right-click operation, or other method or means known in the art. An example of a media file 415 with adjusted pan and zoom within frame 412 is shown in FIG. 4b. In another embodiment, the user may adjust the manipulate the appearance of a media file 415 via cropping, color correction, red eye removal, adding special effects, and other media manipulations known in the art.

The media files, once inserted into and/or manipulated within the template can be removed and/or moved into other media frames within the template. When a media file is removed, the frame will return to presenting the default media file. For an alternate embodiment, when a media file is removed, the frame will appear empty. When a media file is moved to another frame, it will be automatically reformatted to conform to the new frame yet retain the manipulations (e.g. pan, zoom, red-eye reduction, etc.) already completed by the user.

At block 340, the user may edit the content of the title 406 and 416 and the body of the formatted electronic message 407 and 417 as shown in FIGS. 4a and 4b. The user may attach files to the electronic message using the Attach button 419 in the message window or other method known in the art, e.g. from a drop-down menu 425, right-click operation, etc. Media files may also be inserted directly into the body of text 417 via a drag and drop operation or other method known in the art, e.g. from a drop-down menu 425, right-click operation, etc. The user may select from various text fonts using the Fonts button 421 in the message window or other method known in the art, e.g. from a drop-down menu 425, right-click operation, etc. The user may select from various text colors using the Colors button 422 in the message window or other method known in the art, e.g. from a drop-down menu 425, right-click operation, etc.

Figure 4C:
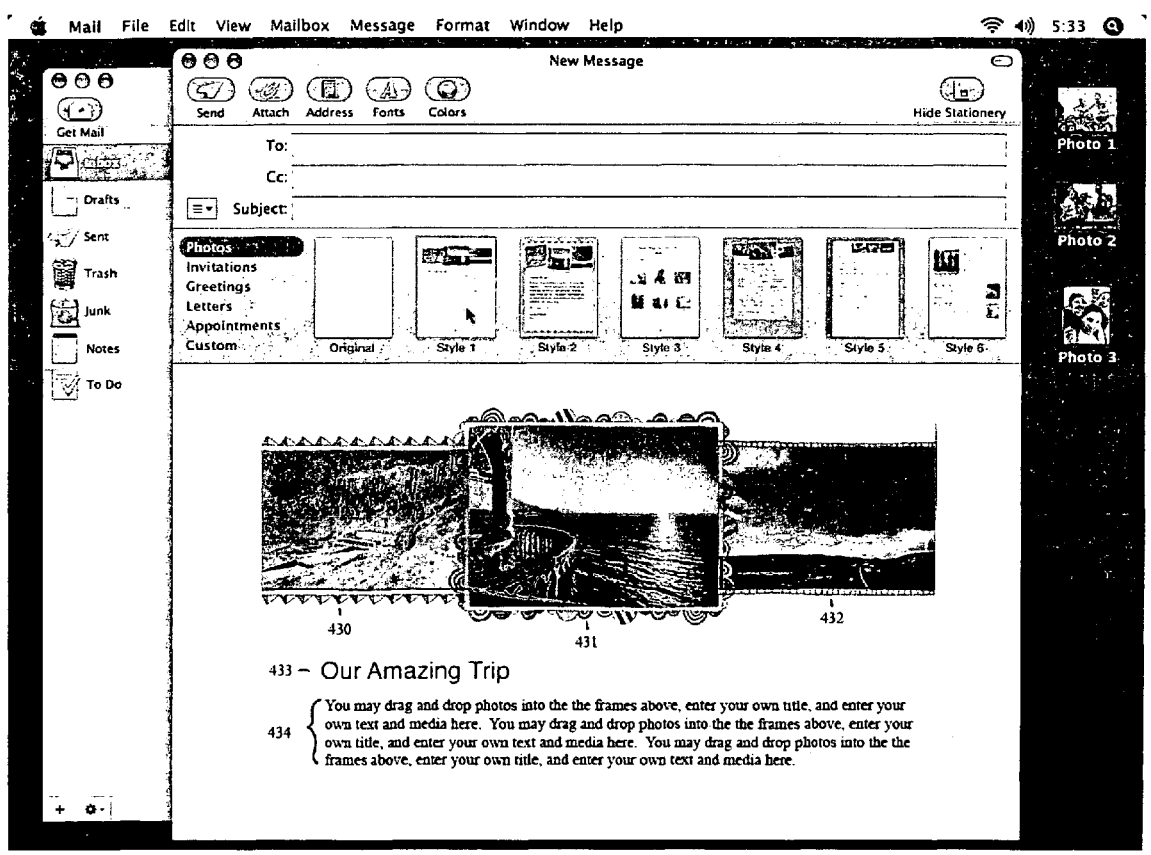
FIG. 4c shows an exemplary user interface for an embodiment of the present invention after switching templates.

At block 350, the user may choose to alternate between editing the body of the electronic message and the stationery template or switch to another stationery template. The user may show or hide the stationery picker by using the Show/Hide Stationery button 424 or other method known in the art, e.g. from a drop-down menu 425, right-click operation, etc. FIG. 4c shows an exemplary embodiment of the present invention after the user has switched templates in reference to FIG. 4a as the initial template. Media files 403-405, title 406, and body 407 have been automatically carried over and reformatted in the newly selected template as media files 430-432, title 433, and body 434.

Referring to FIG. 4b, if the user selects a new stationery template, the edited text 416, 417, and 426, as well as personalized media files 413-415 inserted into frames 410-412 will be carried over into the new stationery template with the same or similar formatting to the previous stationery template.

At block 360, the user indicates one or more recipients of the electronic message and a send command. Recipients may be added by manually entering electronic message addresses in address lines 423 or other method known in the art, e.g. by using Address button 420, selecting them from drop-down menu 425, etc. Once the electronic message is complete, it may be sent by using the Send button 418 or other method known in the art, e.g. from a drop-down menu 425.

At block 370, the electronic message, including the template, is transmitted in a format such that it can be rendered to look the same when opened by the recipient(s). For one embodiment, the electronic message stationery template, title and body are transmitted in Multipurpose Internet Mail Extensions (MIME) Multipart with a Hypertext Markup Language (HTML) part.

Figure 4D:
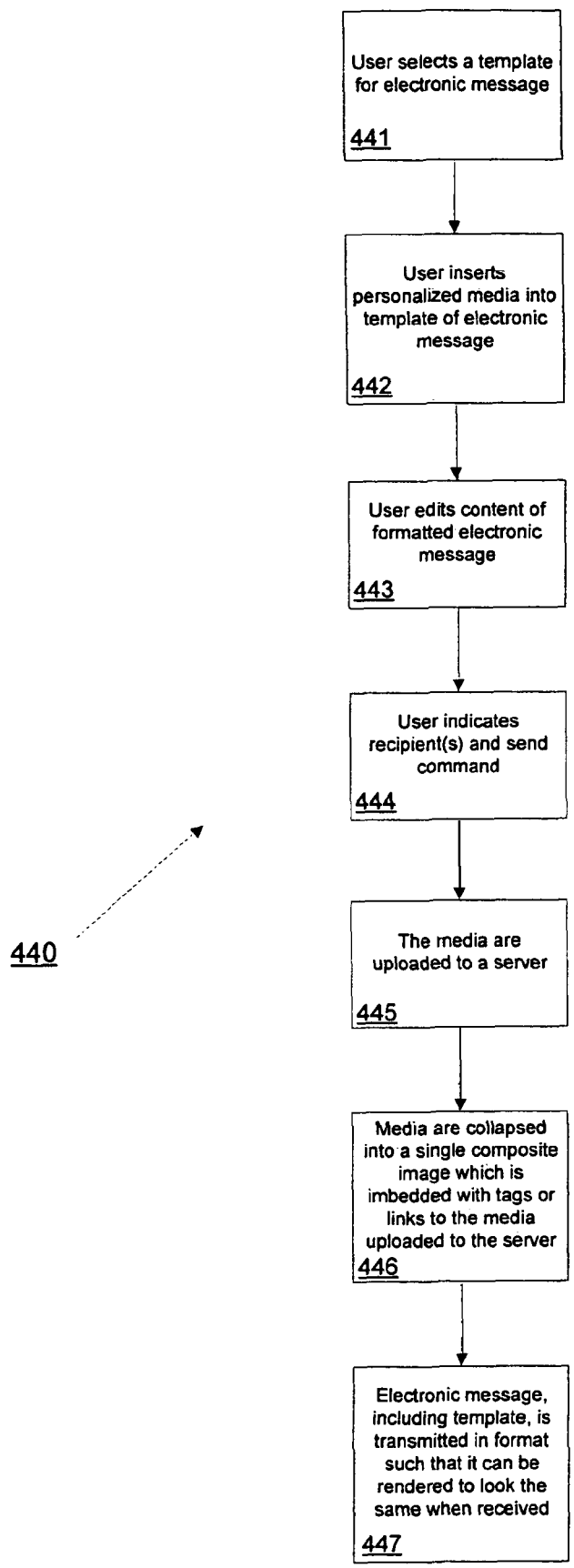
FIG. 4d is a flow chart that shows an exemplary method of the present invention.

FIG. 4d is a flow chart that shows an exemplary method 440 of the present invention. At blocks 441-444, the user selects a template for an electronic message, inserts personalized media into the template, and edits the content of the electronic message prior indicating recipients and a send command as illustrated in the aforementioned description of method 300. Similar to method 300, the order of user operations in method 440 is not limited to the order described in the foregoing specification. The creation, acquisition, selection, and/or editing of a stationery template are fluid in nature and may occur at any point before, during, and/or after creation and/or editing of the body of the electronic message until the electronic message is sent.

At block 445, the individual media files 410-412 may be automatically uploaded to a web server 128 or other server upon the send command and in addition to being collapsed into a single composite image.

At block 446, if the template contains more than image, e.g. media files 410-412 shown in FIG. 4b, the images are collapsed into a single composite image to maintain formatting such as position, orientation, etc. For an embodiment, a composite image is made up of several layers: a background layer, one or more picture layers, and a frames layer. The background consists of a single image. The frames layer consists of a single image. Each picture layer has an image supplied by the default media or the user and a mask image. Any of these images may be partially transparent. One by one the image for each layer is added onto the final image to create the collapsed composite image. For one embodiment, the mask images are first applied to the personalized media images inserted by the user in order to achieve the desired effects of user manipulations (e.g. cropping, pan, zoom, etc.) before it is applied to the composite image.

After the media are collapsed, the single composite image may contain multiple tags or links to each individual media file within web server 128. The recipient(s) may open or save copies of the original, individual media files 410-412 by clicking on the image(s) within the electronic message and initiating an automatic download process from the web server 128. In an alternate embodiment, the individual media files 410-412 may be included with the electronic message as attachments and opened or saved from within the electronic message via a click operation, drag and drop, or other operation known in the art. For another embodiment the media files may be encoded into or otherwise hidden within the message, HTML, or composite image and extracted automatically by the recipient's system in response to a click operation, drag and drop, selection from a drop-down menu, or other operation on the composite image as known in the art. For another embodiment, the user may not have the option of saving the media as originally included by the sender.

At block 447, the electronic message, including the template, is transmitted in a format such that it can be rendered to look the same when opened by the recipient(s). For one embodiment, the electronic message stationery template, title and body are transmitted in Multipurpose Internet Mail Extensions (MIME) Multipart with a Hypertext Markup Language (HTML) part.

Figure 5A:
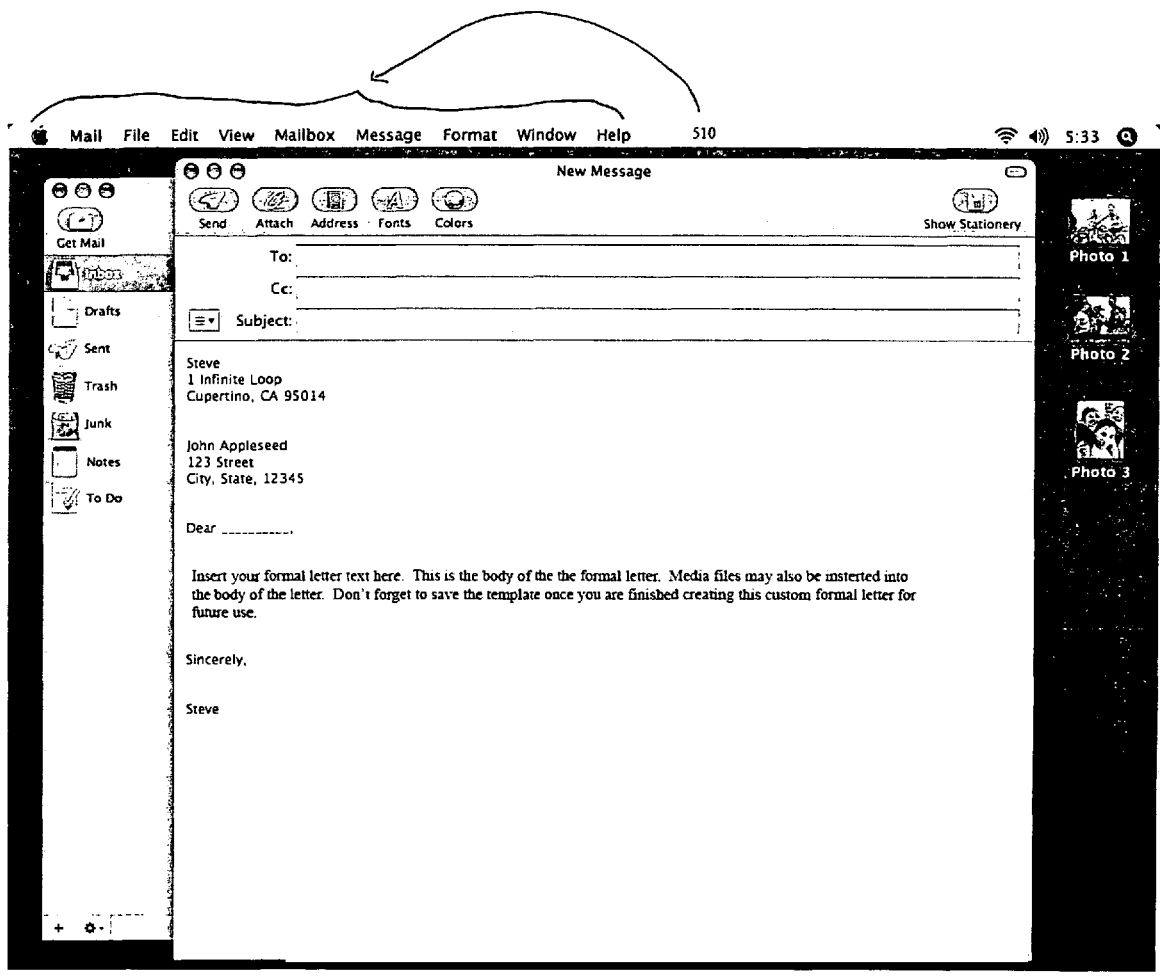
FIG. 5a shows an exemplary user-created template that may be saved for future use according to an embodiment of the present invention.

Referring to FIG. 3, an alternate embodiment of method 300 may begin with one of the multiple preparatory steps, or a combination thereof, at blocks 310-312. At block 310, the user creates a custom template for electronic messages. FIG. 5a shows an exemplary user-created template that may be saved for future use according to an embodiment of the present invention. The user may include media or text in the body of the electronic message. In an alternate embodiment, the user may include media or text in the header, title, footer, as well as areas to the right and left of the body of the electronic message. Use of these designated areas within the electronic message enables the message to be compartmentalized for persistency of content when the user switches templates. For an alternate embodiment, the designated areas within the electronic message may enable transmitting the format to the recipient(s) as intended by the sender.

In an alternate embodiment, the user may create a custom stationery template within a realm of design constraints. For example, the user may choose to create a stationery template with a "fan" of media files at the top of the message. The user may then select the number of media file frames that would be including within the "fan." Increasing the number of media file frames in the "fan" would result in the media files increasingly occluding each other.

In another alternate embodiment, the user may create a custom stationery template from the contents of a web page. The user may select to send a web page as an email from within an internet browser application. This command will transmit the contents of the current webpage to the electronic messaging program and enable the user to edit and save it as a custom template.

Figure 5B:
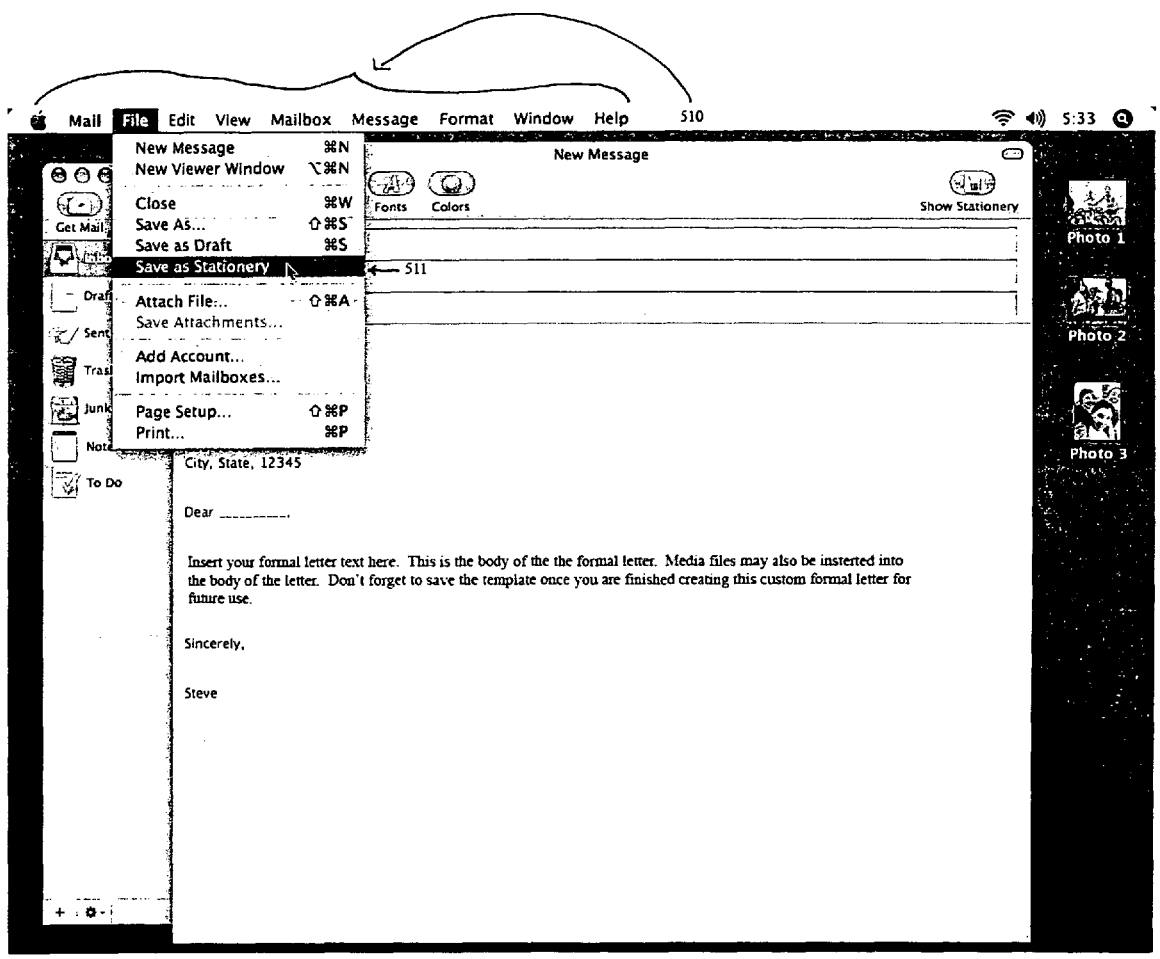
FIGS. 5b and 5c show an exemplary user interface for saving a custom template according to an embodiment of the present invention.
Figure 5C:
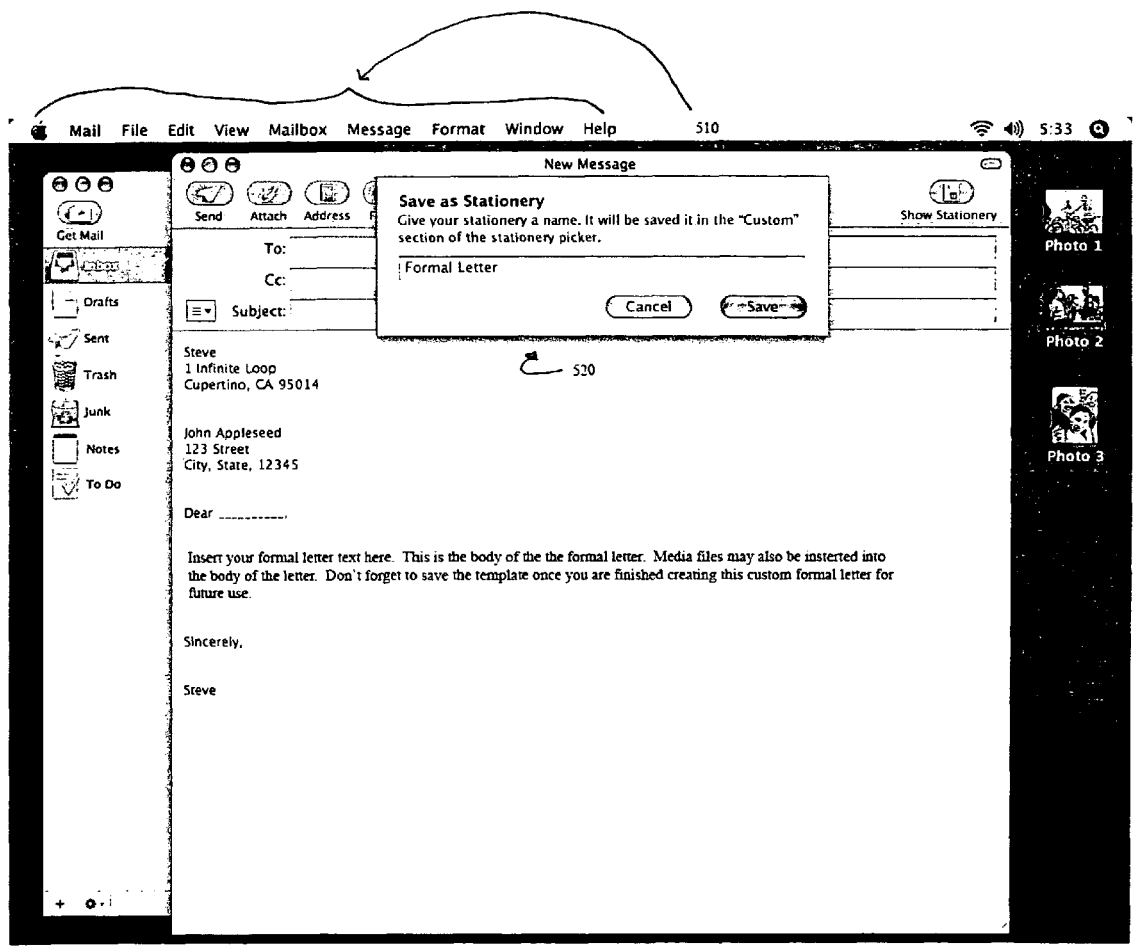
Figure 5D:
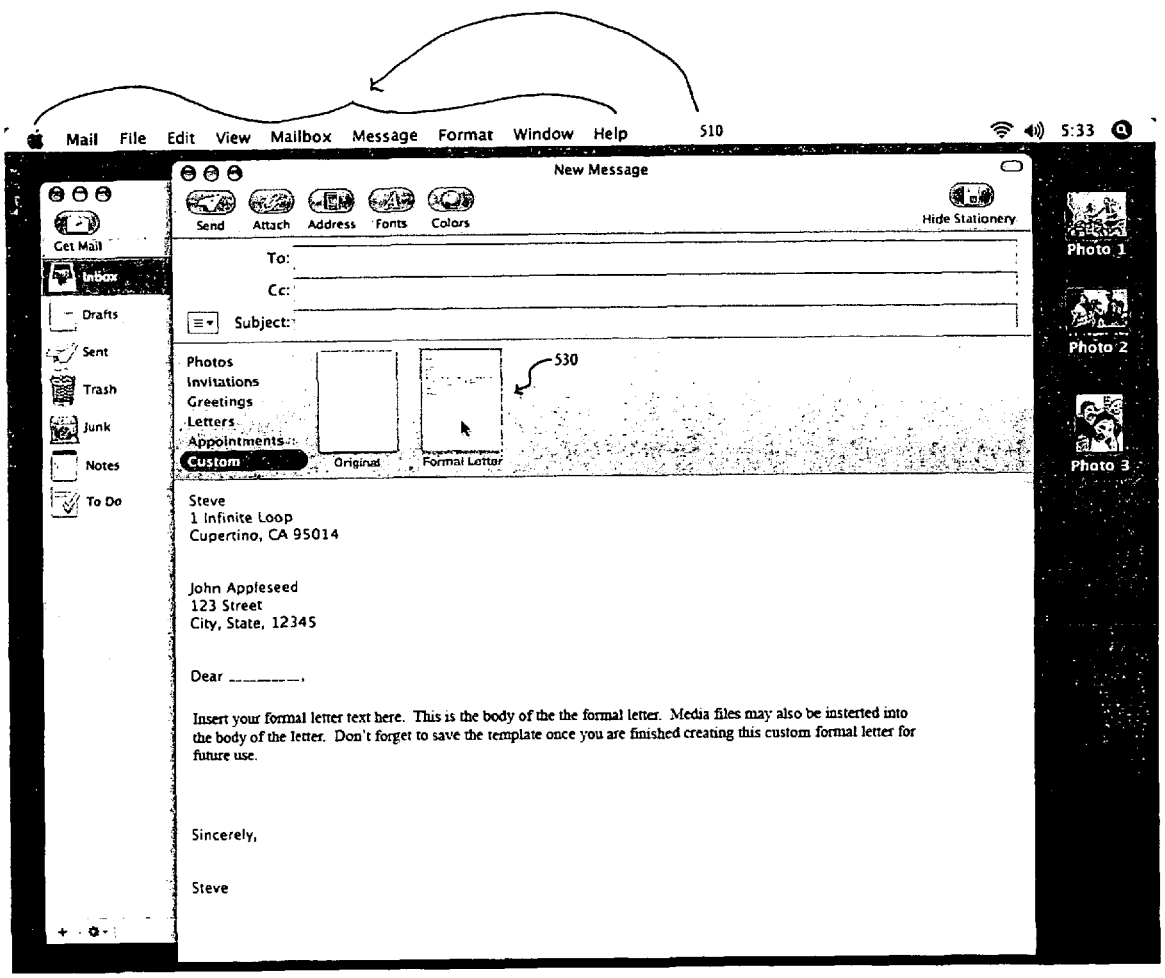
FIG. 5d shows an exemplary user interface for selecting a custom template according to an embodiment of the present invention.

FIGS. 5b and 5c show an exemplary user interface for saving a custom template according to an embodiment of the present invention. Referring to FIG. 5b, the user may select Save as Stationery 511 from drop-down menu 510. In an alternate embodiment, the user may save the stationery template in other methods known in the art, e.g. clicking on a save button, right-click operation, etc. Referring to FIG. 5c, the user may confirm the Save as Stationery operation 520 by giving the stationery template a name and saving it in the Custom section of the stationery picker. In alternate embodiments, the user may save the custom stationery template in other folders accessible to the stationery picker. Referring to FIG. 5d, the saved stationery template will then be available in the stationery picker 530 under the Custom category for selection of a stationery template at block 320 or block 350.

At block 311, the user obtains a template from a third party. Individual developers may create custom stationery templates for distribution via the internet, software, or other means known in the art. The user also may receive a custom template from another user sent as an attachment to an electronic message. For an embodiment, the electronic message received by the third party or another user may contain a button for a single click operation to save the custom stationery template. Alternatively, the user may save the template by other means known in the art, e.g. selecting the appropriate option from a drop-down menu, right-click operation, etc. Once the stationery template has been saved into a folder accessible to the stationery picker 530, the user can select it for use at block 320 or block 350.

At block 312, the user begins by composing the body of the electronic message by inserting text and/or media. At block 320, the user may add a stationery template to the at least partially composed electronic message. The formatting of the body of the electronic message will be carried over into the format of the stationery template. In an alternate embodiment, the user may elect to send the electronic message without adding a stationery template.

The order of user operations in method 300 is not limited to the order described in the foregoing specification. The creation, acquisition, selection, and/or editing of a stationery template are fluid in nature and may occur at any point before, during, and/or after creation and/or editing of the body of the electronic message until the electronic message is sent.

For one embodiment, the aforementioned HTML file may also contain special object fields for elements that may automatically be inserted into the stationery template by the present invention. A label within the HTML file indicates the type of value associated with each special object. For one embodiment, the special object fields may be the name of the sender, a signature, the date the electronic message was composed or sent, the time the electronic message was composed or sent, the sender's picture, the sender's address, or any other information available on the sender's system. Referring to FIG. 4b, signature 426 is one example of a special object field that has been automatically filled for the user. For one embodiment, the special object fields are automatically completed upon creation of the message or selection of a stationery template. Alternatively the special object fields are completed upon indication by the user, or when the electronic message is sent. For another embodiment, the special object fields are automatically completed by the recipient's system with information available on the recipient's system. For example, a mass mailing may utilize a special object in place of the recipient's name and, upon receipt, the recipients system would automatically complete the address or name with the recipient's name.

Figure 6:
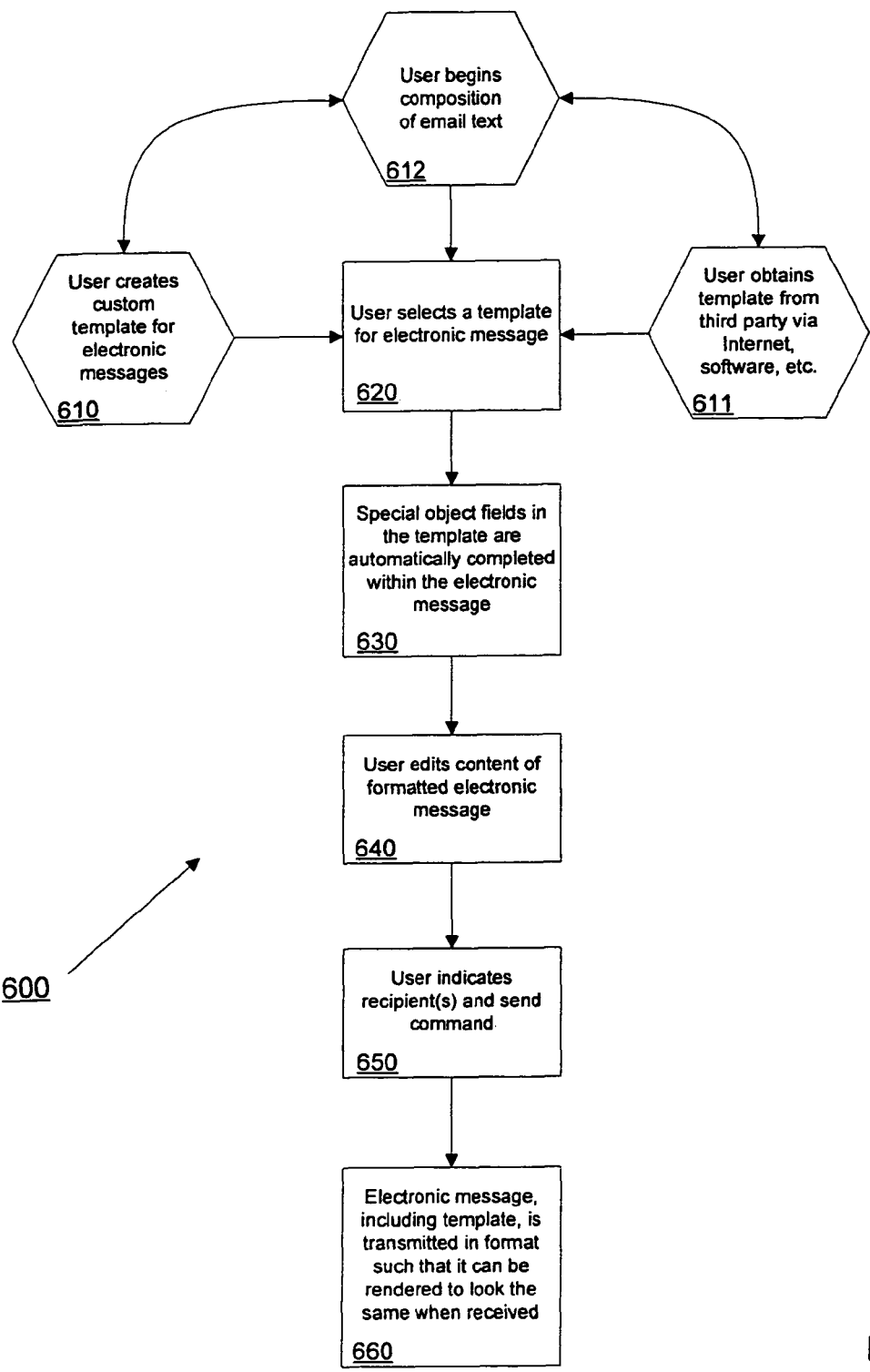
FIG. 6 is a flow chart that shows an exemplary method of the present invention.

FIG. 6 is a flow chart that shows an exemplary method 600 of the present invention. At block 620, a user may begin by selecting an existing stationery template which includes one or more special object fields. The aforementioned description of FIG. 4a provides an exemplary user interface for an embodiment of the present invention, specifically the stationery picker within an electronic messaging program.

Upon selection the stationery template, at block 630, the special object fields in the template are automatically completed within the electronic message. For an embodiment, the special object fields may include one or any combination of the following: the name of the user, the signature block and/or image for the user, the name of the recipient(s), the date the electronic message was composed or sent, and/or the time the electronic message was composed or sent. The special object fields are automatically completed by referencing the label in the HTML file and fetching the associated value. For an embodiment, the values associated with special object fields are stored in another application (e.g. an address book).

At block 640, the user may edit the content of the body of the formatted electronic message as illustrated in the aforementioned description of FIGS. 4a and 4b.

At block 650, the user indicates one or more recipients of the electronic message and a send command. Recipients may be added by manually entering electronic message addresses in address lines 423 or other method known in the art, e.g. by using Address button 420, selecting them from drop-down menu 425, etc. Once the electronic message is complete, it may be sent by using the Send button 418 or other method known in the art, e.g. from a drop-down menu 425.

At block 660, the electronic message is transmitted in a format such that it can be rendered to look the same when opened by the recipient(s). For one embodiment, the electronic message stationery template, title and body are transmitted in Multipurpose Internet Mail Extensions (MIME) Multipart with a Hypertext Markup Language (HTML) part.

Alternatively, similar to method 300, method 600 may begin with one of the multiple preparatory steps, or a combination thereof, at blocks 610-612. At block 610, the user creates a custom template, including one or more special object fields, for electronic messages. At block 611, the user obtains a template including one or more special object fields from a third party.

At block 612, the user begins by composing the body of the electronic message by inserting text and/or media. At block 620, the user may add a stationery template including one or more special object fields to the at least partially composed electronic message. The formatting of the body of the electronic message will be carried over into the format of the stationery template.

The order of user operations in method 600 is not limited to the order described in the foregoing specification and method 600 may be combined, in whole or part, with method 300. The creation, acquisition, selection, and/or editing of a stationery template are fluid in nature and may occur at any point before, during, and/or after creation and/or editing of the body of the electronic message until the electronic message is sent.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method of sending electronic messages, the method comprising:
   identifying, at a computer, a template for an electronic message from a plurality of templates, wherein the identified template comprises a plurality of frames;
   receiving text for the electronic message;
   placing a plurality of images into the plurality of frames of the identified template, wherein each image is placed according to a set of frame attributes of a corresponding frame;
   compositing the plurality of images into a single composite image, wherein the composite image comprises a plurality of regions corresponding to the plurality of images, wherein each region has an associated link for downloading the corresponding image; and
   transmitting the electronic message, wherein the electronic message comprises the received text, the composite image, and the links associated with the different regions of the composite image.

2. The method of claim 1, wherein the set of frame attributes for each frame comprises a size and orientation for an image to be inserted into the frame.

3. The method of claim 1 further comprising adjusting an appearance of an image within a frame of the template by changing a pan or a zoom of the image.

4. The method of claim 1 further comprising receiving user input to edit the electronic message.

5. The method of claim 1, wherein:
   the text for the electronic message is at least partially composed prior to selecting a new template for the electronic message; and
   the composed text of the message is automatically transferred and formatted to conform to the selected new template.

6. The method of claim 1 further comprising:
   modifying the template; and
   saving the modified template.

7. The method of claim 1, wherein the template is identified from a list of one or more categories of templates.

8. The method of claim 1, wherein the template is obtained from another user or other third party.

9. The method of claim 1, wherein the template of the electronic message is created by the user.

10. The method of claim 1, wherein transmitting the electronic message comprises transmitting at least a portion of the electronic message in HyperText Markup Language (HTML).

11. The method of claim 1, wherein the method is performed by a first program for sending and receiving electronic messages, wherein a recipient device utilizes a second different program for sending and receiving electronic messages.

12. The method of claim 1, wherein the template is a first template, wherein the method further comprises receiving user input to select a different second template for the electronic message after the plurality of images has been placed according to the sets of frame attributes of the plurality of frames of the first template, wherein the images are automatically transferred and placed in frames of the second template according to the sets of frame attributes of the frames in the second template.

13. A non-transitory machine readable storage medium storing a program executable by at least one processing unit, the program for sending electronic messages, the program comprising sets of instructions for:

identifying a template for an electronic message from a plurality of templates, wherein the identified template comprises a plurality of frames;

receiving text for the electronic message;

placing a plurality of images into the plurality of frames of the identified template, wherein each image is placed according to a set of frame attributes of a corresponding frame;

compositing the placed plurality of images into a single composite image, wherein the placed plurality of images are arranged in the composite image according to the sets of frame attributes of the corresponding frames, wherein each of the plurality of images has a corresponding region in the composite image, wherein each region has an associated link for downloading the original corresponding image; and transmitting the electronic message, wherein the electronic message comprises the received text, the composite image, and the links associated with the different regions of the composite image.

14. The non-transitory machine readable medium of claim 13, wherein the program further comprises a set of instructions for adjusting an appearance of an image within a frame of the template by changing a pan or a zoom of the image.

15. The non-transitory machine readable storage medium of claim 13, wherein the set of frame attributes for each frame comprises a size and orientation for an image to be inserted into the frame.

16. The non-transitory machine readable storage medium of claim 13, wherein the template is a first template, wherein the program further comprises a set of instructions for receiving user input to select a different second template for the electronic message after the plurality of images has been placed according to the sets of frame attributes of the plurality of frames of the first template, wherein the images are automatically transferred and placed in frames of the second template according to the sets of frame attributes of the frames in the second template.

17. The non-transitory machine readable storage medium of claim 13, wherein:

the text for the electronic message is at least partially composed prior to selecting a new template for the electronic message; and the composed text of the message is automatically transferred and formatted to conform to the selected new template.

18. The non-transitory machine readable storage medium of claim 13, wherein the program further comprises sets of instructions for:

modifying the template; and saving the modified template.

19. The non-transitory machine readable storage medium of claim 13, wherein the template is obtained from another user or other third party.

20. The non-transitory machine readable storage medium of claim 13, wherein the template of the electronic message is created by the user.

21. The non-transitory machine readable storage medium of claim 13, wherein the set of instructions for transmitting the electronic message comprises a set of instructions for transmitting at least a portion of the electronic message in HyperText Markup Language (HTML).

22. The non-transitory machine readable storage medium of claim 13, wherein the program is a first program for sending and receiving electronic messages, wherein a recipient device utilizes a second different program for sending and receiving electronic messages.

23. A data processing system comprising:

a selection module for identifying a template for an electronic message from a plurality of templates, wherein the identified template comprises a plurality of frames;

an input module for receiving text for the electronic message;

an image placement module for placing a plurality of images into the plurality of frames of the identified template, wherein each image is placed according to a set of frame attributes of a corresponding frame;

a compositing module for compositing the plurality of images into a single composite image, wherein the composite image comprises a plurality of regions corresponding to the plurality of images, wherein each region has an associated link for downloading the corresponding image; and a transmitting module for transmitting the electronic message, wherein the electronic message comprises the received text, the composite image, and the links associated with the different regions of the image.

24. The system of claim 23, wherein each region of the plurality of regions displays at least a portion of a corresponding image of the plurality of images.

25. The system of claim 23, wherein the set of frame attributes for each frame comprises a size and orientation for an image to be inserted into the frame.

26. The system of claim 23 further comprising an image adjusting module for adjusting an appearance of an image within a frame of the template by changing a pan or a zoom of the image.

27. The system of claim 23, wherein the template is a first template, wherein the selection module is further for:

selecting a different second template for the electronic message after the plurality of images has been placed according to the sets of frame attributes of the plurality of frames of the first template; and automatically transferring and placing the images in frames of the second template according to the sets of frame attributes of the frames in the second template.

28. The system of claim 27, wherein the text for the electronic message is at least partially composed prior to selecting the different second template for the electronic message, and the selection module is further for automatically transferring and formatting the composed text of the message to conform to the different second template.

29. The system of claim 23 further comprising a template module for:

modifying the template; and saving the modified template.

30. The system of claim 23, wherein the template is obtained from another user or other third party.

31. The system of claim 23, wherein the template of the electronic message is created by the user.

32. The system of claim 23, wherein transmitting the electronic message comprises transmitting at least a portion of the electronic message in HyperText Markup Language (HTML).

33. The system of claim 23, wherein the data processing system is a part of a first program for sending and receiving electronic messages, wherein a recipient device utilizes a second different program for sending and receiving electronic messages.

* * * * *